United States Patent

[11] 3,597,602

[72] Inventors Richard D. Divoky
 Mayfield Heights;
 Peter H. Malmquist, East Cleveland;
 Robert M. Anderson, Pepper Pike, all of,
 Ohio
[21] Appl. No. 784,068
[22] Filed Dec. 16, 1968
[45] Patented Aug. 3, 1971
[73] Assignee General Electric Company

[54] PHOTOFLASH REFLECTOR SUITABLE FOR FLASHCUBE
 10 Claims, 7 Drawing Figs.
[52] U.S. Cl. .................................................... 240/1.3,
 240/103
[51] Int. Cl. ................................................... G03b 15/02
[50] Field of Search ............................................. 240/1.3,
 103; 95/11 L; 431/92, 95

[56] References Cited
 UNITED STATES PATENTS
3,244,087 4/1966 Anderson et al. ............. 240/1.3 X 3,315,071 4/1967 Pfefferle ...................... 240/1.3
3,350,551 10/1967 Whitehead ................... 240/1.3
3,358,131 12/1967 Bennett et al. ................ 240/1 3

Primary Examiner—Samuel S. Matthews
Assistant Examiner—Fred L. Braun
Attorneys—Henry P. Truesdell, Frank L. Neuhauser, Oscar B. Waddell, James J. Lazna and Joseph B. Forman ABSTRACT: A photoflash lamp-reflector module particularly suitable for use in a four-sided photoflash array such as a flashcube. The reflector is formed in the shape of a parabola having curved winged portions whose tangents form an angle of more than 45° with respect to the optical axis of the reflector. Due to the curvature of the winged portions, a series of reflectors may be arranged in a back-to-back relationship with each other to form a flashcube assembly without any interference or distortion occurring between the winged portions of adjacent reflectors. In a preferred embodiment, the reflector is formed at its innermost region with a transversely extending channel-shaped recessed area for snugly accommodating a minor portion of the circumferential extent of a tubular flashlamp throughout substantially its full length.

PATENTED AUG 3 1971
3,597,602
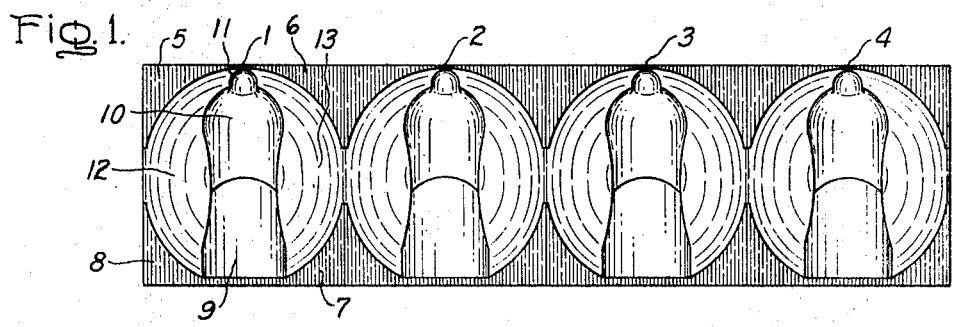
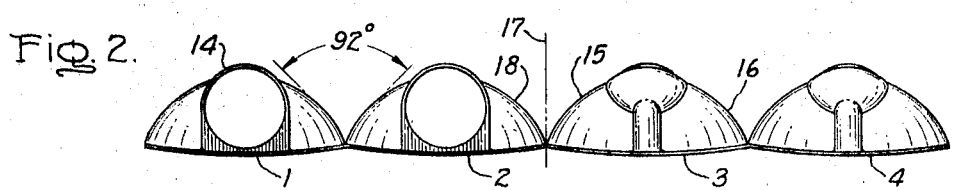
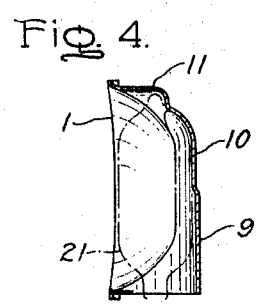
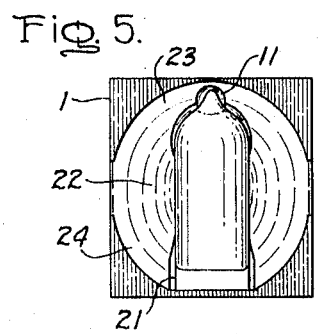
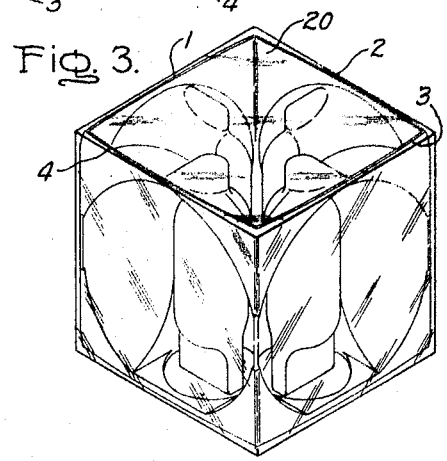
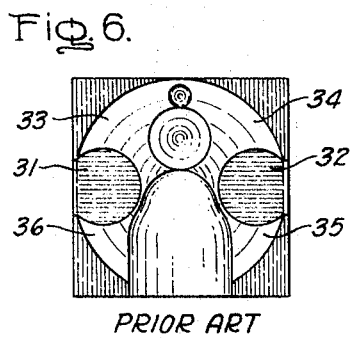
PRIOR ART
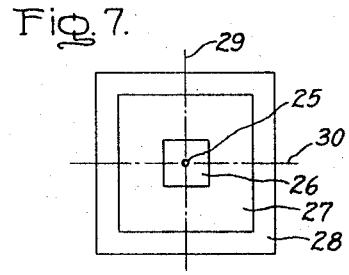
Inventors:
Richard D. Divoky
Peter H. Malmquist
Robert M. Anderson
by Richard H. Burgess
Their Attorney

PHOTOFLASH REFLECTOR SUITABLE FOR FLASHCUBE

CROSS-REFERENCES TO RELATED APPLICATIONS

Related reflectors and reflector-lamp modules for photoflash devices which are more particularly suitable for uses in linear arrays are disclosed and claimed in concurrently filed application Ser. No. 784,066 filed in the name of Donald R. Schindler for "Photoflash Lamp Array with Reflector-Lamp Module," assigned to the assignee of the present invention.

BACKGROUND OF THE INVENTION

The present invention relates to photoflash lamp-reflector units or modules. More particularly, it relates to multiple photoflash lamp arrays such as a flashcube utilizing such modules.

Much of the prior activities in design of combinations of light sources and reflectors has utilized reflector surfaces which are large relative to the light source for optimum light control. In the multiple photoflash device known as the flashcube having four lamp-reflector units facing outwardly in directions at 90° to one another in one plane around the face of the cube, the size of the reflector which could be used was quite small relative to the size of the light source. Much of the internal volume of the flashbulb must be considered as the light source. Reflectors used with flashcubes from the beginning had channels for seating the lamp in the back of a reflector with generally parabolic surfaces going out to each of the four corners of the reflector, an opening at the bottom for the bulb to pass through, fitted areas at the top for the bulb to be located in, and flat wings at each side. The zone of such useful light is considered to be a solid angle having square outlines and being 20° above and below and to the right and left of a central point at the center of the camera focus.

However, as will be appreciated in the optical arts, further improvements in light gain with good control of light distribution are greatly to be desired.

SUMMARY OF THE INVENTION

An object of the present invention is to provide reflector-lamp modules or units particularly suited for flashcubes, but also useful generally in photoflash lamp devices, such modules having greatly increased efficiency of light output per unit volume as compared to the prior art. A further object is to provide such devices having good control over the direction of light output. A still further object of the invention is to maximize the effective reflecting area of a reflector useful for a flashcube.

Briefly stated, the present invention in certain embodiments provides a photoflash device comprising a combination of a reflector and a tubular photoflash lamp wherein the reflector has a parabolic-type surface for essentially its entire effective reflecting area, and the photoflash lamp is seated in the innermost part of the curvature of the surface, and the reflector has an angle, at points thereon forwardly of the centerline of the lamp seated therein and adjacent its rim, of more than 45° to its optical axis in the direction of light projection so that the reflector can be nested back-to-back with three other like reflectors to form four sides of a cube with the rims of adjacent reflectors substantially adjoining one another, without interference between the forward wing portions of the reflectors with each reflector facing in a different direction at about 90° intervals from the adjacent reflector. When the reflector has a vertically cylindrical parabolic-type central portion, the optical axes of the reflector will lie in a plane.

Preferably, the reflector is a continuous surface with change of direction of curvature except that the innermost part of the reflector is recessed to permit locating the lamp further back in the reflector than could be done if the curvature was continuous. The reflector and lamp are preferably bisymmetrical about a plane longitudinally bisecting the lamp.

Both the projected area of the effective reflecting parts of the reflector and the actual parabolic-type surface area are maximized while still allowing fitting of the reflectors into a flashcube shape.

BRIEF DESCRIPTION OF THE DRAWINGS

FIG. 1 is a front elevational view of four reflector units of the invention attached together so that they can be folded into the form of a reflector for a flashcube.

FIG. 2 is an end view of the same group of reflectors as shown in FIG. 1 illustrating the preferred angle between the reflectors to prevent distortion caused by interference between the individual reflector units when the sheet is folded into the flashcube configuration.

FIG. 3 is an isometric view illustrating the reflector portions of a flashcube with a light-transmitting protective cover over the top and sides of the cube.

FIG. 4 is a side view of a reflector-lamp module of the invention.

FIG. 5 is a front elevational view of the same subject as FIG. 4.

FIG. 6 is a front view of a flashcube reflector of the prior art.

FIG. 7 is an illustration of a zonal lumen pattern for measuring effectiveness for photography and the uniformity of light control by a photoflash lamp-reflector unit.

DESCRIPTION OF THE PREFERRED EMBODIMENTS

The present invention provides smooth reflector surfaces without flat sections so as to obtain optimum light control from a photoflash lamp in a flashcube. The preferred parabolic-type reflector of the invention has a curvature which is best used by forming a tunnel or channel at the back of the reflector into which the lamp is fitted so that the curvature of the reflector surface can most efficiently direct light from the lamp onto the object being photographed.

Turning now to the drawings, FIG. 1 shows four reflector units of the invention formed on a sheet of material such as aluminized plastic with the rims of adjacent ones of the reflectors substantially adjoining one another. The four units are 1, 2, 3 and 4. Each unit has surfaces of generally a parabolic type shown at 12 and 13 in unit 1, and has recessed areas for positioning a photoflash lamp of the all-glass type down into the reflector for optimum light control and for confining the lamp substantially entirely within the reflector. These recessed areas preferably include base shroud 9, body tunnel 10, and tip recess 11. Flat areas 5, 6, 7 and 8 on the front of the reflector are not useful in the control of light and their size is preferably minimized. FIG. 2 is an end view of the sheet of four reflectors shown in FIG. 1 with units 1 and 2 shown from the bottom and units 3 and 4 from the top. It shows the hole 14 in which a photoflash lamp is inserted and illustrates that the wings 15 and 16 shown in unit 3 have continuous curvature rather than flat areas and have an angle between them greater than 90°. An angle of 92° is illustrated between units 1 and 2. The angle tangent to the curvature of each wing and relative to the optical axis of the reflector as shown at 17 between units 2 and 3 is always greater than 45° to prevent interference between the reflector wings such as wing 15 of unit 3 and wing 18 of unit 2 which would cause distortion and loss of light control on bending the four-unit reflector into the configuration of a flashcube.

FIG. 3 illustrates a flashcube with transparent cover 20 over reflector units 1, 2, 3, and 4. The flashcube is shown with flashlamps being in place, and the base of the flashcube is not illustrated, but it is well known in the art.

FIG. 4 is a side view of a reflector-lamp unit of the invention showing flash lamp 21 positioned in reflector 1 with tip recess 11, body tunnel 10 and base shroud 9 permitting seating of the lamp back in the reflector with a minor portion of its circumferential extent, throughout substantially the full length of the lamp, snugly accommodated in the tunnel 10 and base shroud 9. Base shroud 9 facilitates insertion of the lamp 21 into reflector 1 by automatic equipment.

FIG. 5 shows a front view lamp 21 in reflector 1 having the same configuration as FIG. 4.

Experiments have shown that best results are obtained in reflectors of the general type necessary for the present invention if they follow an equation essentially of a parabolic type which includes for purposes of the invention formulas in the family $$y = ax^n$$

where $1.5 < n < 3$. Although a true parabola has an equation of $y = ax^2$, that curvature does not give optimum results with the present invention due to the comparatively large size of the lamp 21 and of the light source relative to the reflector, and due to the fact that there is no point light source on which the parabola can be focused. Therefore, relatively minor variations from $x$ being taken to the second power are made in the equation with the resulting formula still being described as of essentially a parabolic type for purposes of the present invention. Flashcubes of the prior art utilize some surfaces of a parabolic type having equations of approximately $y = 1.630x^2$. The reflector which seems optimum for the present invention has a curvature according to the equation $y = 1.593x^{2.145}$. This can be considered to be essentially $y = 1.6x^{2.14}$, and equations according to the formula $y = ax^b$ can be considered to be included within the invention when $a$ is between about 1.611 and 1.593 and $b$ is between about 2.072 and 2.145.

The invention includes photoflash devices comprising the described reflectors, as well as such reflectors for use in such devices. Of course, specific values for $a$ and $b$ for the invention can vary outside these limits since they are dependent on the relative sizes of the lamp diameter and the reflector opening, which are about 0.368 and 0.937 inches respectively for the flashcube.

Within the constraints of the standard flashcube lamp and reflector sizes, a true parabolic with $6 = ax^2$ with the center of the lamp at the reflector focus either must be very shallow with the lamp recessed into the reflector curvature to an undesirable depth with too great a loss of light, or reflecting flats must be used to permit fitting four reflectors into a flashcube configuration.

The smooth curvature of reflectors of the present invention can be compared to the reflectors of prior art flashcubes in FIG. 6 wherein flats 31 and 32 are less efficient in control of light than are the corresponding parabolic portions 22 (FIG. 5) of reflectors of the present invention. Also, the parabolic-type surfaces 33, 34, 35 and 36 in flashcube reflectors of the prior art are smaller than the corresponding parabolic-type areas 12 and 13 shown in FIG. 1 for the present invention.

Whereas flashcube reflectors of the prior art with flats 31 and 32 do not present images to the viewer directly in front of lamps in all areas of the reflector in that flats 31 and 32 are not filled with images of the lamp, while the entire parabolic-type reflector of the present invention is filled with images of the lamp, it is apparent that the reflector of the present invention is inherently more efficient than reflectors of prior art flashcubes. Thus, it can be seen that reflector-lamp combinations of the present invention considerably outperform those of the prior art.

Reflectors of the present invention have parabolic-type surfaces for essentially their entire effective reflecting surfaces 12 and 13, rather than using substantial reflecting flats like 31 and 32 of the prior art flashcube reflector.

Preferably, reflectors of the present invention are produced with the described parabolic-type surface parabolic-type vertical cylindrical form in their central portion in the vicinity of the middle of the lamp as shown at 22 in FIG. 5. This central cylindrical parabolic-type potion 22 of the reflector is easily produced in a die in which the plastic sheet to form the reflector is pressed by a linear movement of a rotating tool which has been cut to the right configuration for producing the parabolic-type surface. The end portions 23 and 24 of the reflector are at least partial surfaces of parabolic-type form of revolution readily produced by the tool used to press the cylindrical parabolic-type middle portion 22. These surface of revolution are naturally left in the plastic sheet at the end of the traverse of the tool.

In the photographic arts, it is desirable that light from photoflash lamps be concentrated as greatly as possible within the picture-taking area, but have a minimum of variation across that picture-taking area. Comparisons of light output control can be made with reference to the zonal lumen chart of FIG. 7. Relative to center point 25, the chart has three mutually independent adjacent solid angle bands 26 of 5°, 27 of 10°, and 28 of 5° in each of the sidewards and vertical directions along perpendicular axes 29 and 30. Flashcubes with preferred reflectors of the invention with the same overall size and the same types of flash lamps as prior art flashcubes have been measured as typically directing about 10 percent more light on the picture-taking area, 26, 27 and 28, of the zonal lumen chart than prior art flashcubes. Also, these reflector-lamp modules of the invention have been measured at a variance of brightness between the center region 26 and the outer region 28 of less than 2:1 such as about 1.70:1.

What we claim as new and desire to secure by Letters Patent of the United States is:

1. A photoflash device comprising the combination of a reflector and a photoflash lamp wherein:

said photoflash lamp is a tubular lamp, said reflector has a parabolic-type reflecting surface for essentially its entire effective reflecting area with said photoflash lamp seated in the innermost part of the reflector and confined substantially entirely therewithin and with the reflector having forward wing portions extending forwardly beyond the centerline of said lamp and terminating in a peripheral rim, and said reflector has a curvature the tangent to which, at points thereon forwardly of the centerline of the lamp seated therein and adjacent to the rim forms an angle of more than 45° to the optical axis of the reflector at all points forward in the direction of light projection so that said reflector can be arranged back-to-back with three other like reflectors in adjacent relation to one another to form four sides of a cube, with each reflector facing outwardly in a different direction at 90° intervals from the adjacent reflector and with the rims of adjacent reflectors substantially adjoining one another, without interference between their said forward wing portions.

2. A photoflash device according to claim 1 in which said lamp and said reflector are bisymmetrical on the two sides of a plane bisecting the lamp longitudinally.

3. A photoflash device according to claim 1 in which four of said reflectors are formed adjacent to each other in a single sheet of material with the rims of adjacent reflectors substantially adjoining one another so that the sheet of material may be folded at the dividing regions between adjacent reflectors to produce a device with reflectors and lamps facing outwardly in each of the four directions in one plane to form four sides of a cube, without interference of the surfaces of one reflector with the surfaces of another such as would cause distortion therein.

4. A photoflash device according to claim 1 in which the curvature of said parabolic-type surface is continuous except for part of the region behind said lamp at the innermost portion of the reflector wherein the reflector surface is formed at its innermost region with a channel-shaped recessed area extending transversely of its optical axis and within which the said lamp is longitudinally positioned with a minor portion of its circumferential extent, 5. A photoflash device according to claim 2 in which four of said reflectors are formed adjacent to each other in a single sheet of material with the rims of adjacent reflectors substantially adjoining one another and with the axes of their recessed lamp-positioning areas extending parallel to each other so that the sheet of material may be folded at the dividing regions between adjacent reflectors to produce a device with reflectors and lamps facing outwardly in each of the four directions in one plane to form four sides of a cube, without interference of the surfaces of one reflector with the surfaces of another such as would cause distortion therein.

6. In a photoflash device according to claim 4 a reflector having a parabolic-type surface approximately according to the formula $$y=ax^b$$

wherein $a$ is approximately between 1.611 and 1.593 and $b$ is approximately between 2.072 and 2.145.

7. A photoflash device according to claim 6 having a reflector which has a parabolic-type surface approximately according to the formula $$y=1.6x^{2.14}$$

8. A photoflash device according to claim 1 wherein said reflector comprises a cylindrical parabolic-type central portion middle of said lamp, and said reflector terminates at and at least partial paraboloidal-type surfaces at each end of said cylindrical central portion, and said lamp is positioned in said reflector longitudinally of the said cylindrical central portion thereof.

9. A photoflash device according to claim 1 in which the portions of said reflector having a parabolic-type surface have a curvature approximately according to the formula $$y=ax^b$$

wherein $a$ is approximately between 1.611 and 1.593 and $b$ is approximately between 2.072 and 2.145.

10. A photoflash device according to claim 9 having a reflector which has a parabolic-type surface approximately according to the formula $$y=1.6x^{2.14}$$